(No Model.)
E G. HARRIS.
LOG RAFT.
No. 455,617.  Patented July 7, 1891.
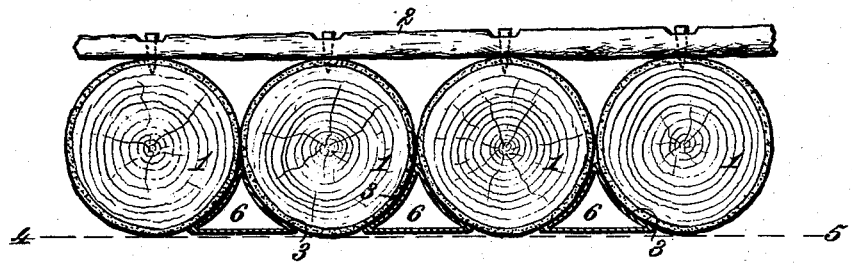
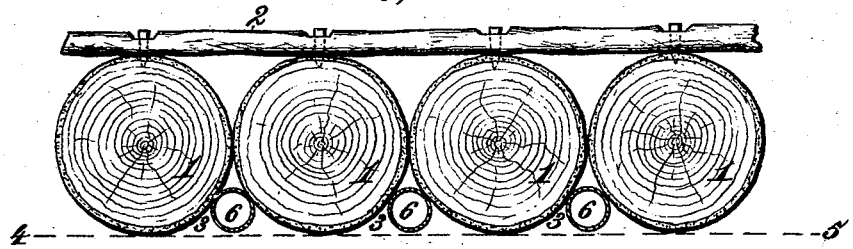
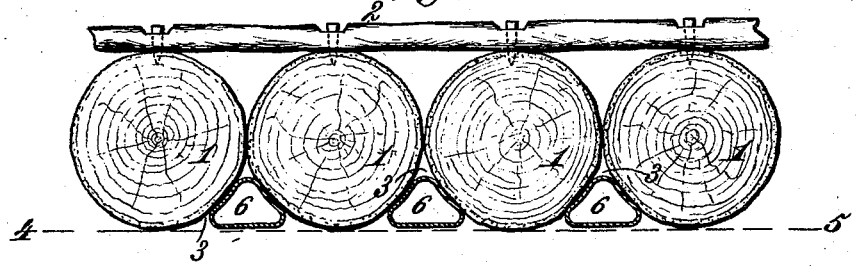
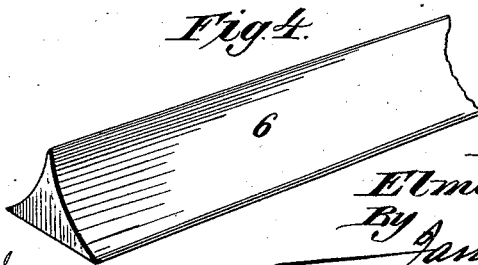
Witnesses.
Robt Everett.
J. A. Rutherford.
Inventor:
Elmo G. Harris,
By James L. Norris.
Atty.

UNITED STATES PATENT OFFICE.

ELMO G. HARRIS, OF ROB ROY, ARKANSAS.

LOG-RAFT.

SPECIFICATION forming part of Letters Patent No. 455,617, dated July 7, 1891.

Application filed December 1, 1890. Serial No. 373,214. (No model.)

*To all whom it may concern:*

Be it known that I, ELMO G. HARRIS, a citizen of the United States, residing at Rob Roy, in the county of Jefferson and State of Arkansas, have invented new and useful Improvements in Log-Rafts, of which the following is a specification.

This invention relates to rafts composed of hard-wood logs which are too heavy or not sufficiently buoyant to float on the surface of water for their transportation to a shipping-port or to market.

The object of my invention is to provide a log-raft wherein buoys are so arranged as to float the logs and at the same time be so shielded or guarded as to prevent their being crushed or injured in case of collision or while the raft is passing over bars, logs, or other obstructions in the water.

To such end the invention consists, essentially, in a log-raft having buoying-vessels containing confined air and arranged under the raft in the spaces between the convex surfaces of contiguous logs.

The invention also consists in a log-raft having buoying-vessels containing confined air and located within the spaces between the convex surfaces of contiguous logs and a line tangential to the lowermost sides of the logs.

The invention further consists in a log-raft having prismoidal buoys containing confined air and located under the raft within the spaces between the convex surfaces of the contiguous logs.

The invention is illustrated in the accompanying drawings, in which—

Figure 1 is a sectional view showing a portion of a log-raft embodying my invention. Fig. 2 is a similar view, showing a modified construction of the buoys. Fig. 3 is a similar view showing another modification. Fig. 4 is a detail perspective view of a portion of one of the prismoidal buoys.

In order to enable those skilled in the art to make and use my invention, I will now describe the same in detail, referring to the drawings, wherein—

The numeral 1 indicates the logs, which are rafted together in any manner suitable for the conditions required; but, as here shown, are secured side by side through the medium of a tie-bar 2, any number of which may be employed, as circumstances demand. In a log-raft of this type a space 3 is formed between the convex surfaces of two contiguous logs and a horizontal or approximately horizontal line 4 5, which is tangential to the lowermost sides of the logs, and within each of such spaces 3 I place a buoy 6, composed of an air-tight vessel containing confined air, the construction being such that the lower surfaces of the buoys are in substantially the same plane with or above the line which is tangential to the lowermost sides of the logs, whereby the buoys are protected by the logs against being crushed in case of a collision, while the raft can pass over bars, logs, or other obstructions in the river without breaking or damaging the buoys, since the latter do not project beyond the lowermost sides of the logs. The buoys shown in Fig. 1 are prismoidal or approximately triangular in cross-section.

In each figure of the drawings I have exhibited a buoy arranged in every space 3; but I do not confine myself to any definite number of buoys, as this will depend on circumstances, and therefore it may be possible to employ a less number of the buoys.

The arrangement of the buoys within the spaces between the convex surfaces of the logs and a line which is tangential to the lowermost sides of the logs is important, in that the buoys float the raft and are protected by the logs from being crushed or injured in case of a collision or in passing over bars, logs, or other obstructions. The prismoidal buoys are desirable, in that they conform substantially to the spaces between contiguous logs, and buoys of greater capacity can thus be employed than where hollow cylinders are used.

The invention is especially designed for transporting hard-wood logs which will not float on the surface of water by their own buoyancy.

Having thus described my invention, what I claim is—

1. A log-raft having buoying-vessels containing confined air and arranged under the raft in the spaces between the convex surfaces of the logs, substantially as described.

2. A log-raft having buoying-vessels containing confined air and located within the spaces formed between the convex surfaces of the logs and a line tangential to the lowermost sides of the logs, substantially as described.

3. A log-raft having prismoidal buoys located under the raft within the spaces between the convex surfaces of the logs, substantially as described.

In testimony whereof I have hereunto set my hand and affixed my seal in presence of two subscribing witnesses.

ELMO G. HARRIS. [L. S.]

Witnesses:
F. B. FLANDERS,
W. H. MATTHEWS.